(12) United States Patent
Parrish

(10) Patent No.: US 6,955,799 B1
(45) Date of Patent: *Oct. 18, 2005

(54) HIGH TEMPERATURE DECOMPOSITION OF HYDROGEN PEROXIDE

(75) Inventor: Clyde F. Parrish, Melbourne, FL (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 10/923,152

(22) Filed: Aug. 12, 2004

Related U.S. Application Data

(63) Continuation-in-part of application No. 10/014,140, filed on Dec. 6, 2001, now Pat. No. 6,793,903.

(60) Provisional application No. 60/276,260, filed on Mar. 8, 2001.

(51) Int. Cl.$^7$ .............................................. C01B 21/36

(52) U.S. Cl. ..................... 423/400; 423/239.1; 423/402
(58) Field of Search ............................... 423/400, 402, 423/235, 239.1

(56) References Cited

U.S. PATENT DOCUMENTS

| | | | |
|---|---|---|---|
| 3,991,167 A | 11/1976 | Depommier | |
| 4,341,747 A | 7/1982 | Downey | |
| 4,426,364 A | 1/1984 | Cooper | |
| 5,000,930 A | 3/1991 | Boguslawski | |
| 5,112,587 A | 5/1992 | Von Wedel | |
| 5,366,711 A | 11/1994 | von Wedel | |
| 5,550,096 A | 8/1996 | Inoue | |
| 5,980,847 A | 11/1999 | Iwasaki | |
| 6,047,543 A | 4/2000 | Caren | |
| 6,162,409 A | 12/2000 | Skelley | |
| 6,264,899 B1 | 7/2001 | Caren | |
| 6,284,211 B1 | 9/2001 | Miyadera | |
| 6,793,903 B1 * | 9/2004 | Parrish ........................ 423/400 |

* cited by examiner

*Primary Examiner*—Wayne A. Langel
(74) *Attorney, Agent, or Firm*—Randall M. Heald; Gary G. Borda; Guy Miller

(57) ABSTRACT

Nitric oxide (NO) is oxidized into nitrogen dioxide ($NO_2$) by the high temperature decomposition of a hydrogen peroxide solution to produce the oxidative free radicals, hydroxyl and hydroperoxyl. The hydrogen peroxide solution is impinged upon a heated surface in a stream of nitric oxide where it decomposes to produce the oxidative free radicals. Because the decomposition of the hydrogen peroxide solution occurs within the stream of the nitric oxide, rapid gas-phase oxidation of nitric oxide into nitrogen dioxide occurs.

10 Claims, 2 Drawing Sheets ature decomposition of hydrogen peroxide to oxidative free radicals, such as, hydroxyl radical (HO) and hydroperoxyl radical (HOO.), which oxidize nitric oxide (NO) to nitrogen dioxide ($NO_2$).

HIGH TEMPERATURE DECOMPOSITION OF HYDROGEN PEROXIDE

CROSS-REFERENCE TO RELATED APPLICATION

This is a continuation-in-part of U.S. application Ser. No. 10/014,140, filed Dec. 6, 2001, now U.S. Pat. No. 6,793,903, which is based on Provisional Application No. 60/276,260, filed Mar. 8, 2001, both of which are incorporated fully herein by reference.

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

This invention relates generally to a method and apparatus for the high temperature decomposition of hydrogen peroxide to form oxidative free radicals, such as, hydroxyl radical (HO) and hydroperoxyl radical (HOO.), which oxidize nitric oxide (NO) to nitrogen dioxide ($NO_2$).

2. Description of the Background Art

Power plants produce a large amount of nitric oxide that must be removed from exhaust gas streams before the gas stream may be emitted into the environment. Effective removal of nitric oxide from the gas stream is complicated by its low water solubility. Although water scrubber systems may be used to aid in the removal of nitric oxide from the gas streams, the effectiveness of the water scrubber system may be increased by oxidizing the nitric oxide to nitrogen dioxide. Nitrogen dioxide is more water soluble than nitric oxide and can be easily removed from the gas streams using various removal processes, such as the water-based scrubber systems. Although nitric oxide does slowly oxidize in air to nitrogen dioxide, an effective oxidizing agent is needed to make the oxidation of nitric oxide effective at low concentrations (~25 to 350 ppm). This low concentration of NO represents a target planned by the US EPA for power plant applications. By 2004, the EPA will require that coal and oil fired power plants install new controls that lower the NOx emissions to 110 ppm. The 2004 requirement for natural gas NOx emissions will be lowered in 2004 to 50 ppm. Currently, the Selective Catalytic Reduction (SCR) method is the only technology that can meet these 2004 EPA requirements.

Gas-phase oxidation of nitric oxide to nitrogen dioxide may be increased by using ozone, hydrogen peroxide, atomic oxygen, hydroxyl radicals or hydroperoxyl radicals as oxidizing agents. The problems with these materials are their high cost and complexity. Injection of hydrogen peroxide in a heated (300 to 400° C.) nitric oxide gas stream or the introduction of an ultraviolet light source to decompose hydrogen peroxide to form oxidative free radicals are examples of known technology with high processing costs. Another expensive material that has been used to oxidize nitric oxide is ozone. A need therefore exists for a highly effective and low cost method for oxidation of nitric oxide.

SUMMARY OF THE INVENTION

To overcome the foregoing problems, the subject invention provides a method and apparatus wherein a hydrogen peroxide solution is directed onto a heated surface in a nitric oxide stream so that the hydrogen peroxide is decomposed to form oxidative free radicals, hydroxyl and hydroperoxyl, for the oxidation of the nitric oxide. The hydrogen peroxide solution is preferably delivered to the heated surface through a nozzle, which may also be heated, to increase the concentration of and thereby enrich the hydrogen peroxide solution. Impinging the enriched hydrogen peroxide solution onto a heated surface accelerates the decomposition of hydrogen peroxide. Because the rapid decomposition of hydrogen peroxide occurs on the heated surface, there is no increased risk of explosion of stored hydrogen peroxide solution. Since the high temperature decomposition of hydrogen peroxide to oxidative free radicals, hydroxyl and hydroperoxyl, occurs in a stream of nitric oxide, distribution of the oxidative free radicals in the stream will cause rapid gas-phase oxidation of the nitric oxide to nitrogen dioxide.

This high temperature decomposition process provides a simple way for increasing the instability of hydrogen peroxide to the point of decomposition. The process only requires a small pump, a nozzle, a heated surface, and an optional heated tube. There is no need to heat the gas stream that contains the nitric oxide or to introduce an ultraviolet light source or ozone generator.

This process may be used in small scrubbers or large scrubbers similar to those found in power plants. The basic unit is the same for both applications, but the power plant would use multiple units distributed across the flue stack. The commercial potential for this high temperature decomposition process when used in combination with a wet scrubber for nitrogen dioxide is very large. Power plant applications that control NOx emission are estimated to cost in the billions of dollars. This process is the key to making current technology effective in controlling low-level emissions of nitric oxide found in power plants worldwide.

BRIEF DESCRIPTION OF THE DRAWINGS

The features and advantages of the present invention will become apparent from the following detailed description of preferred embodiments thereof, taken in conjunction with the accompanying drawings, in which.

DETAILED DESCRIPTION OF PREFERRED EMBODIMENTS

In the preferred embodiments of the present invention, high temperature decomposition of hydrogen peroxide to form the oxidative free radicals, hydroxyl and hydroperoxyl, provides a convenient source of highly effective oxidizing agents for the oxidation of nitric oxide in the gas-phase. This high temperature decomposition process avoids problems of complexity and costs common to other methods for the decomposition of hydrogen peroxide.

Figure 1:
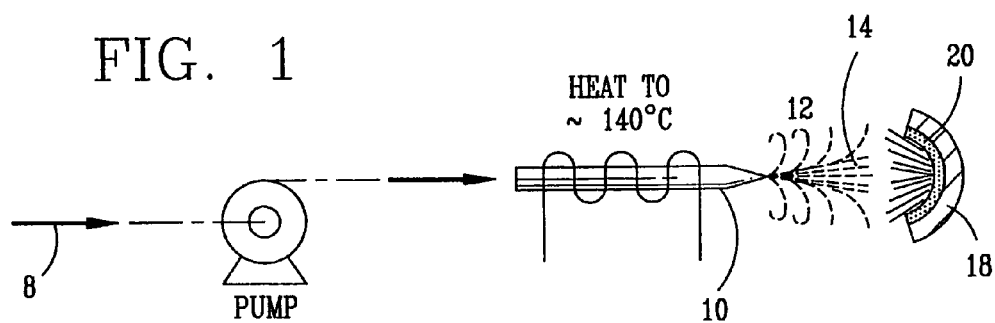
FIG. 1 illustrates an example of the high temperature decomposition process of the subject invention for hydrogen peroxide.

An example of the high temperature decomposition process is illustrated in FIG. 1. Prior to impinging a hydrogen peroxide solution 8, preferably containing hydrogen peroxide and water, onto a heated surface 18, the hydrogen peroxide solution 8 may be optionally heated to vaporize some of the water into steam 12. The hydrogen peroxide solution 8 is preferably pumped through a tube or nozzle 10. In this example, the hydrogen peroxide solution 8 is heated to ~140° C. If the hydrogen peroxide solution 8 is heated, water in the heated hydrogen peroxide solution 8 evaporates in the form of steam 12 resulting in an enriched hydrogen peroxide solution 14. This enriched hydrogen peroxide solution 14 impinges on the heated surface 18, which is preferably heated to 150°–500° C., where oxidative free radicals, hydroxyl and hydroperoxyl, are produced. The decomposition of hydrogen peroxide occurring on the heated surface 18 results in rapid decomposition without increasing the risk of an explosion of the hydrogen peroxide solution 8 that is in storage prior to use. Preferably, the heated surface 18 contains a catalytic material 20 composed of a variety of catalysts including, but not limited to, metals, metal oxides, and salts. Preferred salts include, but are not limited to, hydroxides, aluminates, molybdates, and permanganates. Most preferably, the catalytic material 20 is selected from those materials listed in Table 1.

TABLE 1

| | |
|---|---|
| Fe(II), Fe(III) | Cr(II) |
| Cu(II) | Pt black |
| Ag | Pd |
| Palladium, preferably on stainless steel screen | $MnO_2/CuO$, preferably on ceramic support |
| $KMnO_4$ | $K_2MoO_4$ |
| $MnO_2/CuO/Al_2O_4$ | Rust Iron |
| $MnO_2$ | Ir/Pt/Pd, preferably on ceramic beads |
| $FeO/Fe_2O_3/Fe(OH)_2$ | $MgMoO_4$ |
| $CoMoO_4$ | $Fe_2(MoO_4)_3$ |
| $MgAl_2O_4$ | $CoAl_2O_4$ |
| $Fe_2(Al_2O_4)_3$ | $CeO_2$, preferably nano and micron size particles |
| $Fe_2(OH)_3$ | $Mn(OH)_2$ |
| $Al(OH)_3$ | $Co(OH)_2$ |
| $Mn(OH)_2/Co(OH)_2$ | $SrMoO_4$ |
| $BaMoO_4$ | $Ag_2MoO_4$ |
| $CoMoO_4$ | $FeMoO_4$ |
| $MnMoO_4$ | $MnAl_2O_4$ |
| $CoAl_2O_4$ | $FeAl_2O_4$ |
| $CoAl_2O_4/MnAl_2O_4$ | |

A number of catalytic materials 20 were examined in an effort to find the optimum catalyst for the oxidation of nitric oxide (NO) to nitrogen dioxide ($NO_2$) by the oxidative species created when hydrogen peroxide is decomposed. Although a variety of catalysts will initiate the decomposition of hydrogen peroxide, some catalysts that decompose hydrogen peroxide produce species that oxidize NO to $NO_2$, while others do not. Preferably, the characteristic of the catalyst that is most effective is having an oxidative lifetime that is measured in seconds as indicated by the continued oxidation of NO. The catalytic materials 20 listed in Table 1 may be prepared using a variety of known techniques, including, but not limited to, calcining at high temperatures, preferably 400 to 900° C., or blending and curing at a preferred temperature of 200 to 300° C. In one preferred embodiment, the metal catalytic materials 20 are plated on stainless steel screen wires. In another preferred embodiment, the metal catalytic materials 20 are plated onto ceramic supports. In an alternate preferred embodiment, the metal catalytic materials 20 are used as solids. Additionally, the decomposition of hydrogen peroxide may occur on a variety of catalytic materials 20 including oxide surfaces, such as metal oxides, glass, quartz, Mo glass, $Fe_3$-$xMn_xO_4$ spinels, $Fe_2O_3$ with Cu ferrite, MgO and $Al_2O_3$. A key element for the high temperature decomposition of hydrogen peroxide is contact with a heated surface 18, regardless of whether the surface has a catalytic coating 20 or not. Table 2 discloses a number of preferred catalytic materials 20 and the corresponding heated surface temperatures for decomposing hydrogen peroxide.

TABLE 2

Catalysts and Conditions Used to Decompose Hydrogen Peroxide

| Catalyst | Conditions |
|---|---|
| Silver Oxide | 250–507° C. |
| Iron Oxide | 200–415° C. |
| Ruthenium Oxide | 300–491° C. |
| Silver | 244–325° C. |

In addition to the solids listed in Table 1, hydrogen peroxide is preferably added to water solutions and dispersions containing salts and metal oxides. These solutions and dispersions decompose hydrogen peroxide to produce water and oxygen. Since oxygen has low solubility in water, it is released to the gas phase. Oxygen can exist in the triplet ground state or in the excited singlet state. In addition, the excited singlet state has a relative long life-time (seconds) and it is capable of oxidizing NO to $NO_2$, which is why these solutions and dispersions are preferred. These solutions and dispersions preferably include one or more components and the concentration of hydrogen peroxide is preferably 85 percent or less. In a preferred embodiment, the initial temperature is ambient, but the exothermic reactions can increase the temperatures to 64° C. Listed below are examples of the water solutions and dispersions that are preferably used to oxidize nitric oxide to nitrogen dioxide.

1. Sodium hydroxide solutions
2. Sodium hypochlorite solutions
3. Alumina sol
4. Iron sol
5. Cobalt sol
6. Molybdenum sol
7. Manganese sol
8. Ammonium molybdate solutions
9. Ferric nitrate solutions
10. Potassium molybdates solutions The oxidative free radicals are distributed throughout a gaseous nitric oxide stream, preferably containing 50–350 ppm nitric oxide, to rapidly oxidize NO to $NO_2$. Once the NO is oxidized to $NO_2$, it is more water-soluble and can be scrubbed with a wet scrubber system. The heated tube or nozzle 10 and the heated surface 18 could be fabricated as a single unit that is connected to a pump manifold that supplies the hydrogen peroxide and electrical lines that supply the power for electric heaters for the nozzle 10 and heated surface 18.

The high temperature decomposition process is based on the thermodynamic instability of hydrogen peroxide. High concentrations, preferably those over 50%, of hydrogen peroxide in solution are unstable and the rate of decomposition increases by a factor of 2.3 for each 10° C. temperature rise. Therefore, a solution containing hydrogen peroxide and water is preferably used in this high temperature decomposition. Preferably, high temperature decomposition may be used to decompose hydrogen peroxide solutions up to and including 85% by weight or volume. However, the hydrogen peroxide solutions do not have to be pre-concentrated.

Figure 2:
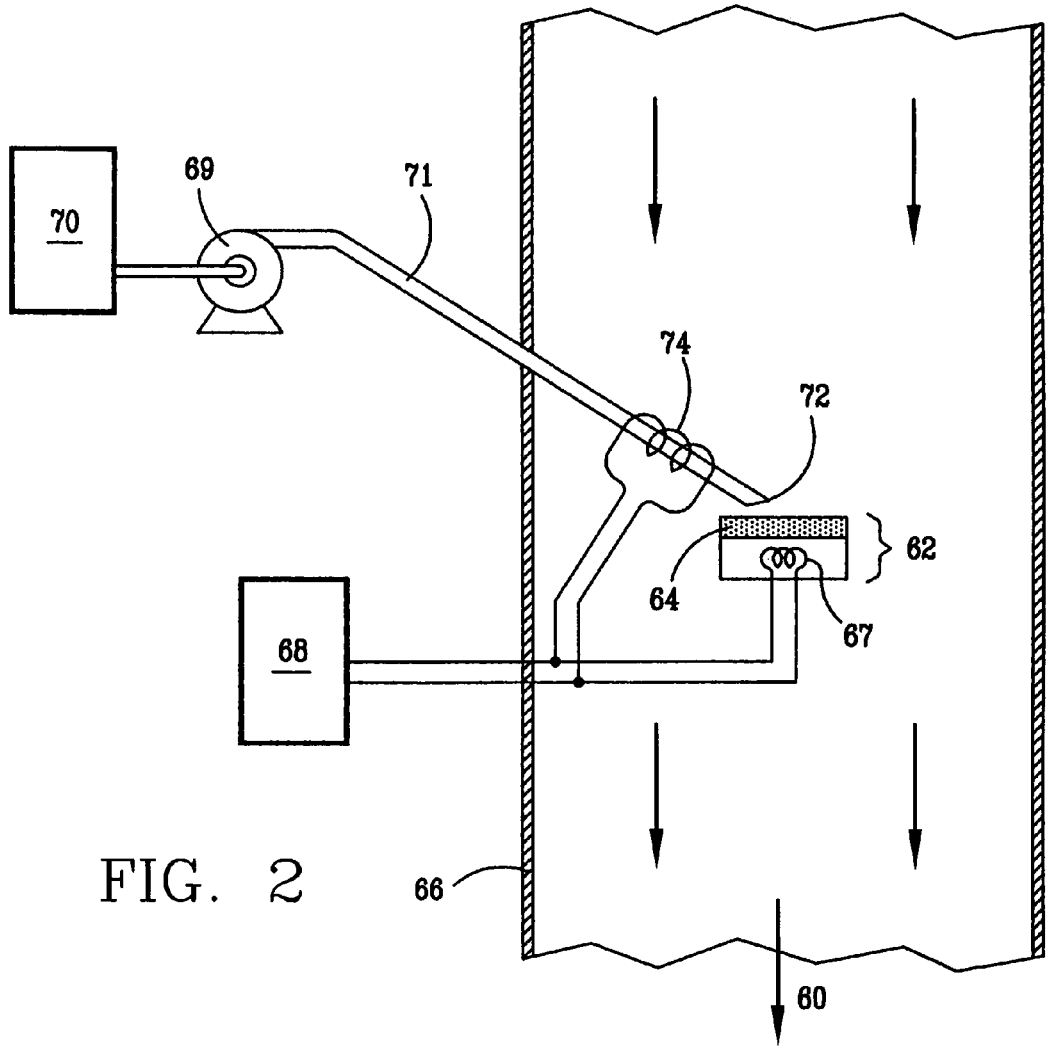
FIG. 2 illustrates an embodiment of the present invention for adding hydrogen peroxide to a nitric oxide exhaust gas stream in a power plant.

As illustrated in FIG. 2, the high temperature decomposition process is preferably used in an exhaust gas stream 60 of a power plant in order to control nitric oxide emissions. A heated block 62, which is optionally covered with a catalytic material 64, is disposed within an exhaust pipe 66 containing the exhaust gas stream 60. The block 62 could also be replaced by any other suitable structure having a major surface thereon that can readily be heated. Alternately, the catalytic material 64 may be a solution of a catalytic or reactive liquid provided within a container, which may be heated with heater 67, and that may be regenerated. The catalytic or reactive liquid is preferably recycled to maintain the initial concentration. A first heater 67, which is powered by a power supply 68, is provided in or adjacent to the block 62 for heating the block 62 to a desired decomposition temperature, preferably 150°–500° C. A pump 69 supplies hydrogen peroxide solution from a storage tank 70 to the heated block 62 via a supply tube 71 terminating with an injection nozzle 72. When catalytic or reactive liquids are used the injection nozzle 72 may be immersed in the liquid. An optional, second heater 74, which is also powered by the power supply 68, may be attached to the injection nozzle 72 to increase the temperature and concentration of the hydrogen peroxide solution. In order to oxidize nitric oxide in the exhaust gas stream 60, the hydrogen peroxide solution in the storage tank 70 is injected onto the heated block 62 through injection nozzle 72, thus forming oxidative free radicals. These free radicals oxidize NO to $NO_2$ which can be scrubbed with a water solution of hydrogen peroxide. Excess unreacted hydrogen peroxide will be captured by the scrubber and form part of the total requirement for hydrogen peroxide.

Typical gas-phase reactions that occur when hydrogen peroxide is catalytically decomposed are shown below:

(1) $H_2O_2 \rightarrow 2HO\cdot$ (2) $HO\cdot + H_2O_2 \rightarrow H_2O + HOO\cdot$ (3) $HOO\cdot + NO \rightarrow NO_2 + HO\cdot$ (4) $2 HO\cdot \rightarrow H_2O_2$ Reactions (2) and (3) represent a chain reaction, which means that once the hydroxyl radical (HO.) forms in reaction (1), reactions (2) and (3) will repeat many times until they are terminated by some impurity or recombination reaction (4). Therefore, reaction (1), the initial decomposition of hydrogen peroxide, only needs to occur for a small percent of the hydrogen peroxide for a large conversion of NO to $NO_2$ to occur.

EXAMPLE 1

Figure 3:
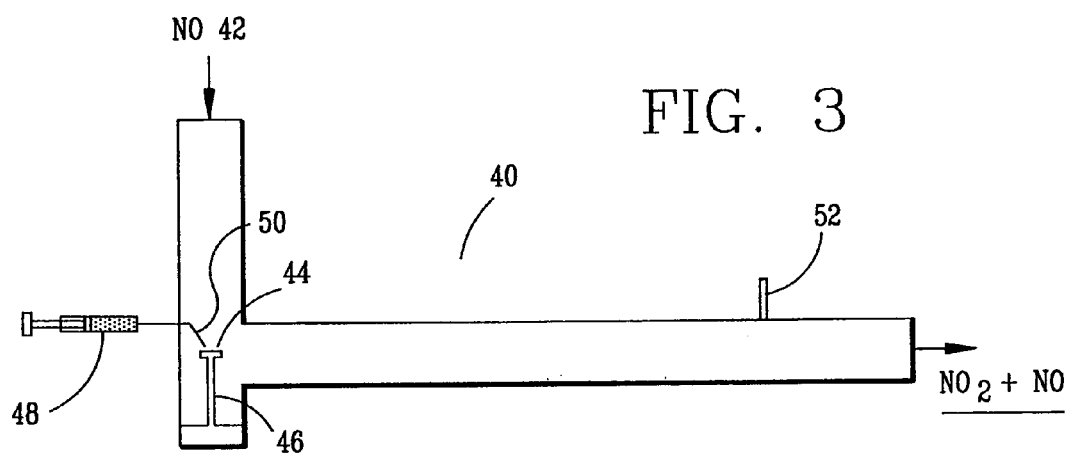
FIG. 3 illustrates a laboratory scale apparatus for adding $H_2O_2$ to a nitric oxide gaseous stream.
Figure 4:
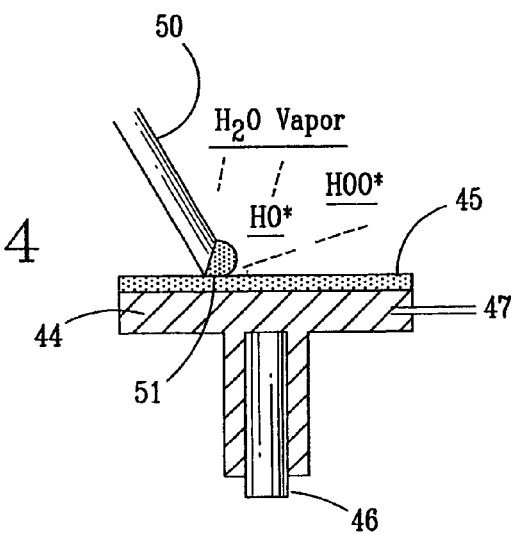
FIG. 4 illustrates a heated surface having a catalytic material that is employed in the apparatus of FIG. 3 for injecting and decomposing hydrogen peroxide.

A laboratory scale breadboard version of the subject high temperature decomposition process was used to confirm the conversion of NO to $NO_2$ when exposed to oxidative free radicals generated from the decomposition of hydrogen peroxide on a heated surface having a catalytic material. In this example, a compressed gas cylinder that contained 5000-ppm nitric oxide in nitrogen was connected to a flow controller adjusted to provide 0.2 liters per minute of the mixture. The output of the flow controller was mixed with the output from a second flow controller that provided 4.8 liters per minute of nitrogen. The resulting mixture, which had a concentration of 200 ppm of NO was introduced into a test fixture 40 as illustrated in FIGS. 3 and 4. The test fixture 40 was fabricated from a 2-inch clear PVC tube that directed the test gas mixture 42 of 200 ppm NO over a mild steel block 44 with a 0.44 square-inch surface area that had an oxidized catalytic coating 45, in this example iron oxide, or a small stainless steel cup that contained catalytic material. A cartridge heater 46 connected to a variable-voltage transformer (not shown) was inserted into the steel block 44. In addition, a thermocouple 47 was inserted into the steel block 44 to measure the surface temperature. A syringe pump 48 was used to provide a controlled flow of 40-volume percent hydrogen peroxide solution 51, which was delivered at a rate of 1 to 3 milliliter (mL) per hour to a syringe needle 50 that touched the heated steel block 44. The syringe needle 50 was configured so the heated steel block 44 also heated the needle tip, which helped increase the concentration of the hydrogen peroxide solution 51 as it contacted the surface of the heated steel block 44. The conversion of NO to $NO_2$ was measured at sample point 52 by ASTM Method D-1607 and a Fourier Transform Infrared (FTIR) method developed for this application.

Figure 5:
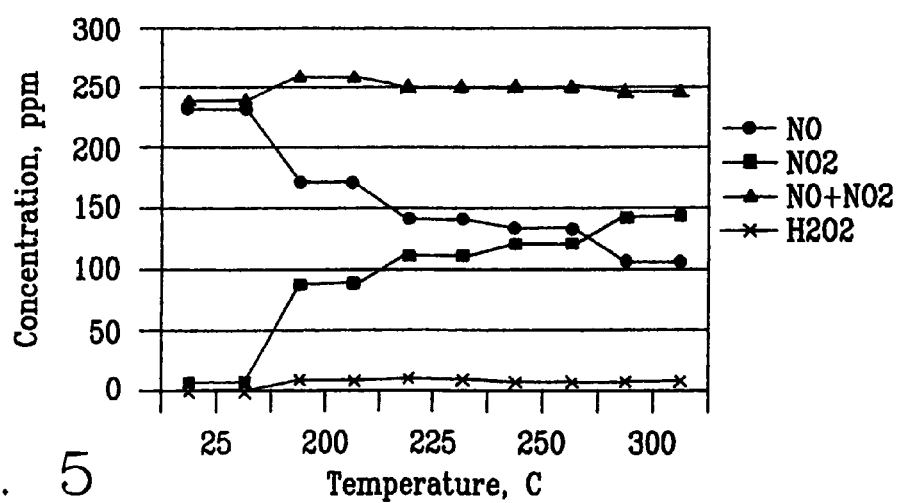
FIG. 5 is a graph of Fourier Transform Infrared (FTIR) results of a laboratory scale version of the high temperature decomposition process showing the conversion of nitric oxide to nitric dioxide as measured at the heated surface at temperatures of 25, 200, 225, 250 and 300° C.

The FTIR results are summarized in the graph of FIG. 5, where the concentrations of NO, $NO_2$, NO plus $NO_2$, and hydrogen peroxide are plotted versus the temperature of the heated surface or steel block 44. It can be seen from the data illustrated in FIG. 5 that the concentration of NO decreases as the concentration of $NO_2$ increases, while the sum of the concentrations remains constant. This constant sum indicates that there is direct conversion of NO to $NO_2$, which was suggested by reactions (2) and (3). These data were generated to illustrate the concept of the high temperature decomposition process and were not intended to provide the optimum conditions for the maximum degree of conversion, which is dependent on the application.

EXAMPLE 2

For power plant applications the concentration of NO is typically in the 200–300 ppm range, which represents about 90 percent of the total NOx emissions with the remainder being primarily $NO_2$. Assuming that the total flow of the gas stream containing NO through the flue gas stack is 1,000,000 cfm, the amount of hydrogen peroxide can be calculated as follows: at 300 ppm NO concentration=300 ppm in 1,000,000 scfm stack gas Temperature after SOx scrubber 50° C.

wt. NO 300 cfm @50° C.=254 scfm NO 254 scfm=391 gm moles NO=21.2 lbs of NO $H_2O_2 + NO \rightarrow NO_2 + H_2O$ $H_2O_2$ required 1 mole NO reacts with 1 mole $H_2O_2$ Therefore: 21.2 lbs of NO required 24 lbs H$_2$O$_2$
or 48 lbs at 50 wt % H$_2$O$_2$ or 4.8 gal/min.

This example starts with a 50% hydrogen peroxide solution and passes it through a check valve to prevent backflow. Then, the hydrogen peroxide solution is heated to raise the temperature to approximately 140° C. as illustrated in FIG. 1. The heat vaporizes some of the water in the hydrogen peroxide solution and produces an enriched hydrogen peroxide solution and steam. The steam and the enriched hydrogen peroxide solution are impinged onto a heated (200–500° C.) surface. The heated surface in this example is covered by a catalytic coating of iron oxide because it produces a high degree of conversion. The resulting process causes the rapid decomposition of hydrogen peroxide to oxidative free radicals, hydroxyl and hydroperoxyl. These oxidative free radicals are produced in a flowing stream of NO where they rapidly oxidize it to NO$_2$.

Although the present invention has been disclosed in terms of a number of preferred embodiment, and variations thereon, it will be understood that numerous additional modifications and variations could be made thereto without departing from the scope of the invention as defined by the following claims:

What is claimed is:

1. A process for oxidizing nitric oxide comprising:
   a) providing a stream of nitric oxide;
   b) providing a heated surface within said stream of nitric oxide;
   c) providing said heated surface with a catalytic material selected from the group consisting of metals, metal oxides, salts and solutions of catalytic or reactive liquids;
   d) providing a hydrogen peroxide solution;
   e) impinging said hydrogen peroxide solution onto said heated surface, and forming a plurality of oxidative free radicals from contact of said hydrogen peroxide solution with said heated surface; and
   f) further oxidizing said nitric oxide to form nitrogen dioxide using said plurality of oxidative free radicals.

2. The process of claim 1, wherein said hydrogen peroxide solution contains 85 wt. % or less hydrogen peroxide.

3. The process of claim 1, wherein said heated surface is heated to a temperature of 150–500° C.

4. The process of claim 1, wherein said stream of nitric oxide contains 50–350 ppm nitric oxide.

5. The process of claim 1, wherein said plurality of oxidative free radicals is selected from the group consisting of hydroxyl radicals and hydroperoxyl radicals.

6. The process of claim 1, further comprising the step of heating said hydrogen peroxide solution before impinging said hydrogen peroxide solution onto said heated surface.

7. The process of claim 6, wherein said hydrogen peroxide solution is heated to a temperature of 140° C. before impinging said hydrogen peroxide solution onto said heated surface.

8. The process of claim 1, wherein said salts are selected from the group consisting of hydroxides, aluminates, molybdates, and permanganates.

9. The process of claim 1, wherein said catalytic material is selected from the group consisting of palladium, MnO$_2$/CuO, KMnO$_4$, K$_2$MoO$_4$, MnO$_2$/CuO/Al2O4, rust iron, MnO$_2$, Ir/Pt/Pd, FeO/Fe$_2$O$_3$/Fe(OH)2, MgMoO$_4$, CoMoO$_4$, Fe$_2$(MoO$_4$)$_3$, MgAl$_2$O$_4$, CoAl$_2$O$_4$, Fe$_2$(Al$_2$O$_4$)$_3$, CeO$_2$, Fe$_2$(OH)$_3$, Mn(OH)$_2$, Al(OH)$_3$, Co(OH)$_2$, Mn(OH)$_2$/Co(OH)$_2$, SrMoO$_4$, BaMoO$_4$, Ag$_2$MoO$_4$, CoMoO$_4$, FeMoO$_4$, MnMoO$_4$, MnAl$_2$O$_4$, CoAl$_2$O$_4$, FeAl$_2$O$_4$, and CoAl$_2$O$_4$/MnAl$_2$O$_4$.

10. The process of claim 1, wherein said solutions of catalytic or reactive liquids include a solution or dispersion selected from the group consisting of a sodium hydroxide solution, a sodium hypochlorite solution, an alumina sol, an iron sol, a cobalt sol, a molybdenum sol, a manganese sol, an ammonium molybdate solution, a ferric nitrate solution, and a potassium molybdates solution.

* * * * *